US006574269B1

United States Patent
Bergamo

(10) Patent No.: US 6,574,269 B1
(45) Date of Patent: *Jun. 3, 2003

(54) ASYMMETRIC ORTHOGONAL CODES FOR WIRELESS SYSTEM RECEIVERS WITH MULTIPLICATION-FREE CORRELATORS

(75) Inventor: Marcos Antonio Bergamo, Wellesley, MA (US)

(73) Assignee: BBNT Solutions LLC, Cambridge, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/718,178

(22) Filed: Nov. 21, 2000

(51) Int. Cl.[7] ................................................ H04J 13/04
(52) U.S. Cl. ....................... 375/142; 375/146; 375/149; 375/145; 375/150
(58) Field of Search ......................... 375/130, 140–142, 375/144–147, 148–150; 370/342

(56) References Cited

U.S. PATENT DOCUMENTS

| 5,615,209 A | 3/1997 | Bottomley | 370/342 |
| 5,677,930 A | 10/1997 | Bottomley | 375/208 |
| 5,757,845 A | * 5/1998 | Fukawa et al. | 370/342 |
| 6,084,884 A | * 7/2000 | Adachi | 370/203 |
| 6,091,760 A | * 7/2000 | Giallorenzi et al. | 370/208 |

OTHER PUBLICATIONS

Marcos A. Bergamo, "Novel All–Digital–Services Full–Integrated Any–Size–Earth–Station Satellite Networking with Support for ATM and Internet Packet Switching with On–Demand Dynamic Capacity Assignment," White Paper (BBN Systems and Technologies), pp. 1–25.

* cited by examiner

Primary Examiner—Amanda T. Le
(74) Attorney, Agent, or Firm—Leonard Charles Suchyta; James K. Weixel

(57) ABSTRACT

A method includes receiving a transmitted signal and generating an orthogonal despreading code that is different than the code used to spread the transmitted signal. The method then despreads the received signal using the orthogonal despreading code. By using a code to despread the received signal that is different than the code used to spread the signal, the overall interference in the system (100) can be reduced.

47 Claims, 5 Drawing Sheets

ASYMMETRIC ORTHOGONAL CODES FOR WIRELESS SYSTEM RECEIVERS WITH MULTIPLICATION-FREE CORRELATORS

FIELD OF THE INVENTION

The present invention relates generally to communication systems and, more particularly, to a system and method that use asymmetric codes for spreading and despreading transmissions in a communication system.

BACKGROUND OF THE INVENTION

The cellular telephone industry has made phenomenal strides in commercial operations in the United States as well as the rest of the world. Growth in major metropolitan areas has far exceeded expectations and is rapidly outstripping system capacity. If this trend continues, the effects of this industry's growth will soon reach even the smallest markets. Innovative solutions are required to meet these increasing capacity needs as well as maintain high quality service and avoid rising prices.

Throughout the world, one important step in the advancement of radio communication systems is the change from analog to digital transmission. Equally significant is the choice of an effective digital transmission scheme for implementing next generation technology.

A current trend in the industry is to move from Frequency Division Multiple Access (FDMA) and Time Division Multiple Access (TDMA) techniques to Code Division Multiple Access (CDMA) techniques. CDMA is a type of spread spectrum technique that allows signals from multiple users to overlap in both time and frequency by assigning different spreading codes to different users. More specifically, CDMA systems "spread" signals across a common communication channel by multiplying each signal with a unique spreading code sequence, such as a unique orthogonal code. A transmitter then scrambles and transmits the signal on the common channel in overlapping fashion as a composite signal. Each receiver correlates the composite signal with a respective unique despreading code sequence that is an exact replica of the spreading code sequence used to spread the signal at the transmitter to extract the signal addressed to it.

The correlation operation performed at the receiver generally involves chip-by-chip, or even worse, sample-by-sample multiplication of the incoming signal with the value of each chip of the matching spreading code sequence followed by an addition of all the product results. Receivers use matched filters to perform the correlation operation. The multiplication operation performed by the matched filters can range from sign comparisons (i.e., a multiplication by "1" or "−1") in the case of bi-phase signals, to exclusive-OR (XOR) operations in the case of digital signals, to complex multiplication operations in the case of systems with complex-valued spreading code sequences. As such, receivers often need complex matching filters to despread signals received using spread spectrum techniques. Moreover, by despreading a received signal with a despreading code sequence that is an exact replica of the code used to spread the signal in the transmitter, the receiver may experience increased interference. This increased interference may be due to interference caused by one's own transmission (e.g., due to multipath) or by the transmission of others (e.g., due to the near-far effect).

There exists a need for a system and method that reduces the interference in spread spectrum transmissions and the complexity of spread spectrum receivers.

SUMMARY OF THE INVENTION

Systems and methods consistent with the present invention address this need by providing a mechanism that reduces the interference of spread spectrum transmissions and allows for the implementation of a less complex receiver.

A system, consistent with the present invention, for processing a signal in a wireless network includes a transmitter and a receiver. The transmitter selects a spreading code from spreading matrix, spreads a signal using the spreading code, and transmits the spread signal through the wireless network. The receiver selects a despreading code from a despreading matrix that is the inverse of the spreading matrix, despreads the transmitted signal, and processes the despread signal.

In another implementation consistent with the present invention, a method includes receiving a transmitted signal and generating an orthogonal despreading code that is different than the code used to spread the transmitted signal. The method further includes despreading, the received signal using the orthogonal despreading code and processing the despread signal.

In yet another implementation consistent with the present invention, a method includes generating a spreading code matrix, such that rows of the spreading code matrix correspond to different spreading codes. The method assigns a first group of spreading codes from the spreading code matrix to a first signal to be transmitted and a second different group of spreading codes to a second signal to be transmitted. The method assigns the second different group of spreading codes such that a third group of unassigned spreading codes is located between the assigned first group and the assigned second group of spreading codes. The method spreads the first and second signals using the assigned spreading codes. The method then transmits the first and second spread signals.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of implementations consistent with the present invention refers to the accompanying drawings. The same reference numbers in different drawings identify the same or similar elements. Also, the following detailed description does not limit the invention. Instead, the scope of the invention is defined by the appended claims.

Systems and methods consistent with the present invention provide a mechanism that reduces the overall interference in a spread spectrum communication network and allows for the implementation of a less complex receiver. A receiver consistent with the present invention despreads a signal received via the network by using a despreading code that is different than the code used to spread the signal. The receiver generates a despreading code having such a format that allows for a select-and-add operation to be performed to despread the received signal. Such a receiver reduces interference due to multipath and the near-far effect and allows for the implementation of a less complex receiver.

Exemplary Communications Network

Figure 1:
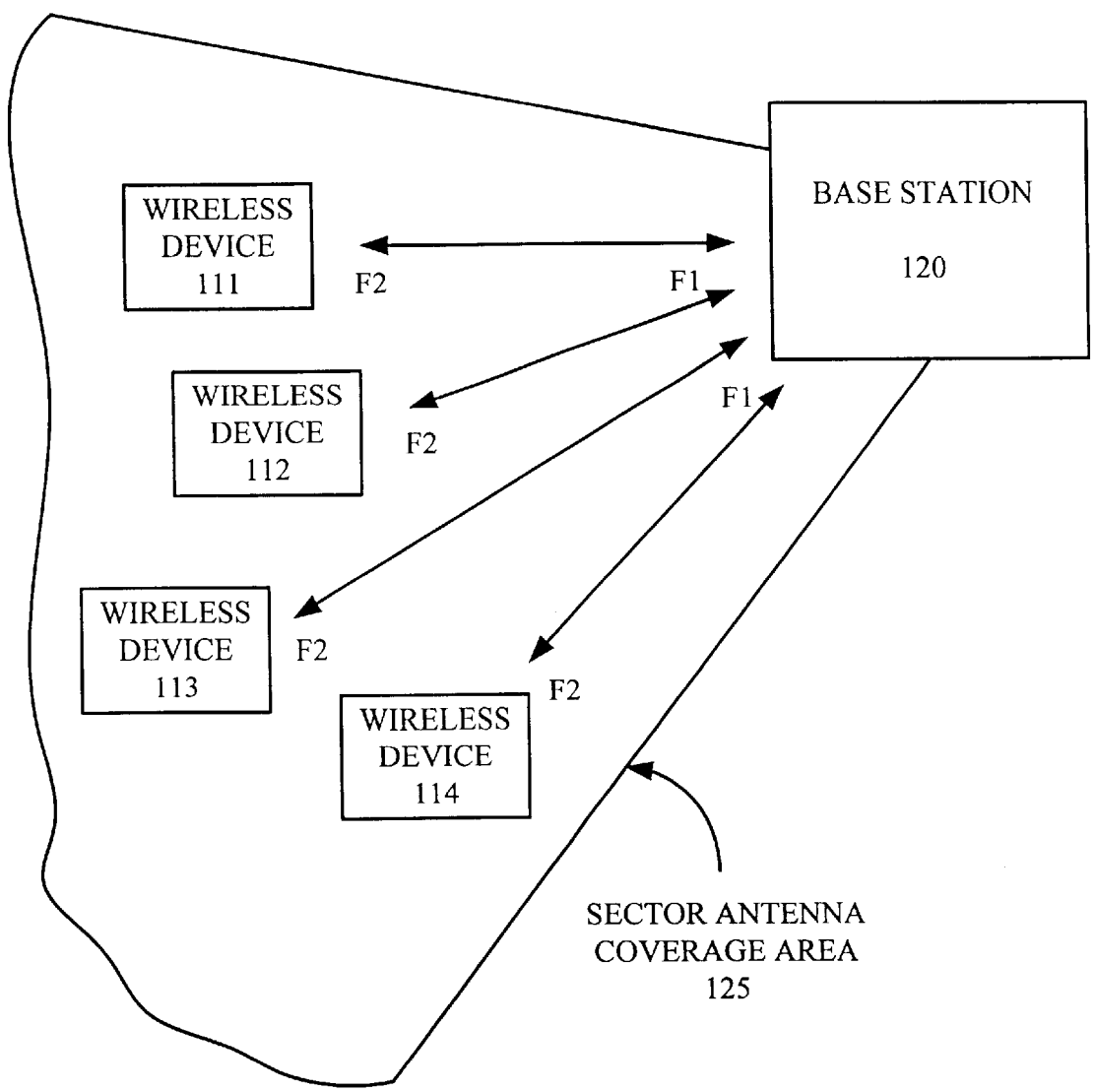
FIG. 1 illustrates an exemplary wireless communication network in which systems and methods consistent with the present invention may be implemented.

FIG. 1 illustrates an: exemplary wireless communication network 100 in which systems and methods consistent with the present invention may be implemented. In FIG. 1, network 100 includes several wireless devices 111–114 that share a pair of forward and return channels, F2 and F1, respectively, of an antenna sector area 125 of a cell. It is assumed for simplicity that the forward channel is associated with frequency F2 and the return channel is associated with frequency F1. While the network 100 shows only one sector, one pair of frequency-channels, and only four wireless devices 111–114, the actual number of sectors per cell, number of frequency channels per sector, and number of wireless devices per frequency channel/antenna sector pair may be larger in practice.

The base station 120 includes one or more transmitters and receivers (or transceivers) for communicating with the wireless devices 111–114 over the selected pair of frequency channel F1 and F2, and antenna sector 125.

Each wireless device 111–114 includes one or more transmitters and receivers (or transceivers) for communicating with the base station 120 in a manner that will be described in more detail below.

Exemplary Return Channel System

Figure 2:
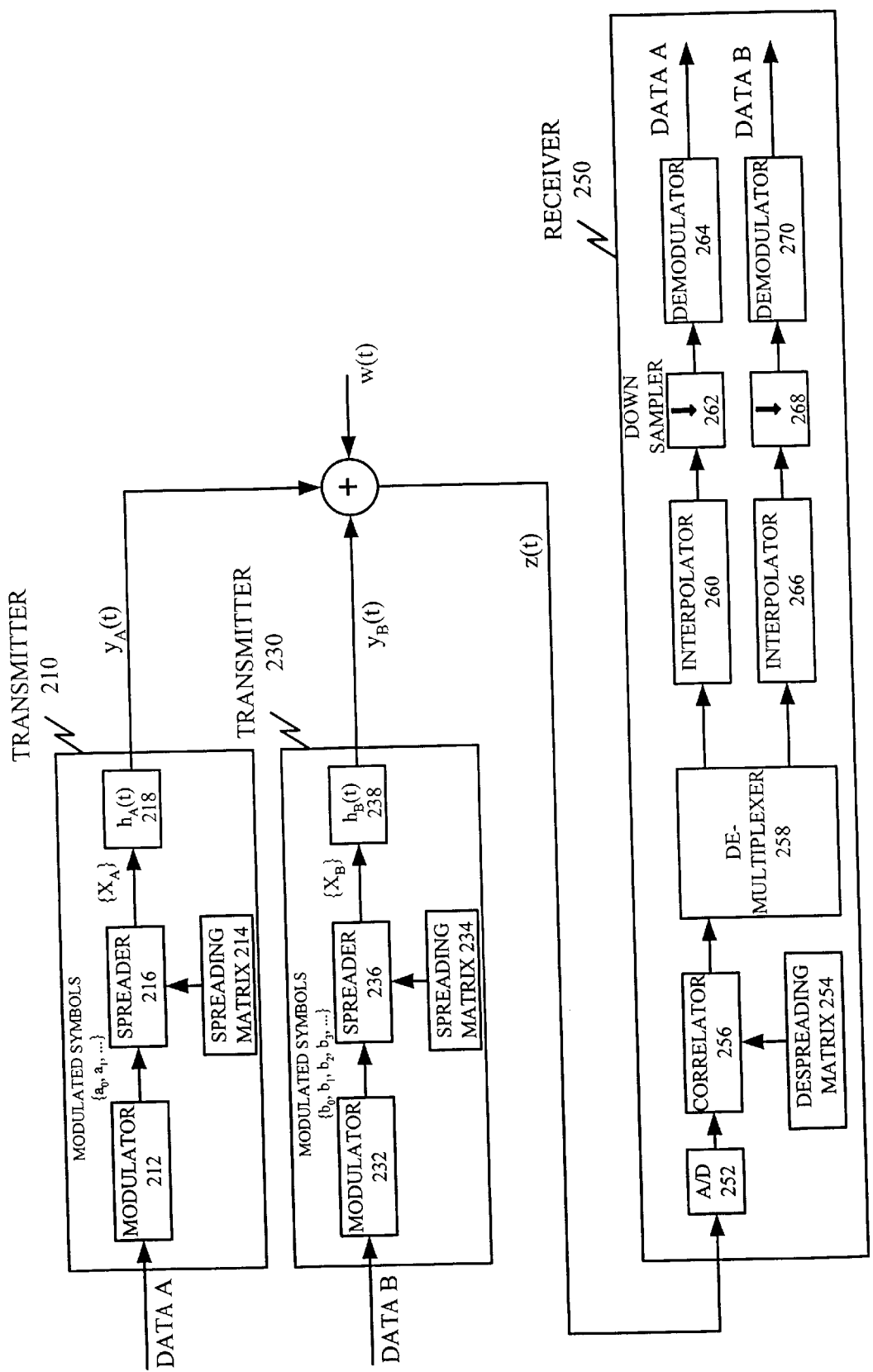
FIG. 2 illustrates the return channel of an exemplary CDMA system consistent with the present invention.

FIG. 2 illustrates an exemplary return channel, consistent with the present invention, of the wireless network 100. The exemplary return channel includes transmitters 210 and 230 located, for example, in wireless devices 111 and 112, and a receiver 250 that may be located in base station 220. The exemplary transmitters 210 and 230 and receiver 250 may be implemented via hardware, software, or a combination of hardware and software. The exemplary return channel system can operate in any of the frequency-channel/antenna sector pairs available. Operation in a selected frequency channel requires the use of frequency up-converters (not shown) at the transmitters 210 and 230 and a frequency down-converter (also not shown) at the receiver 250.

In FIG. 2, the exemplary transmitter 210 includes a data modulator 212, a spreading matrix generator 214, a modulated symbol spreader 216, and a channel-equivalent filter 218. The exemplary transmitter 230 includes similar devices 232 through 238. The channel-equivalent filters 218 and 238 are not necessarily identical since the corresponding channels from the wireless devices to the base station may have different propagation characteristics (e.g., different multipath). It will be appreciated that the transmitters 210 and 230 may include additional devices that aid in the transmission or processing of information.

In the exemplary transmitter 210, the modulator 212 receives a binary data signal A to be transmitted. The data signal may be composed of a sequence of packets, each packet with bits from different signals (e.g., a voice signal, a data signal, or a video signal). Each signal may have to be transmitted using different power levels, different modulation levels (i.e., number of bits per symbol), or even with different modulation formats (e.g., multi-level phase modulation and multi-level quadrature amplitude modulation) to meet the bit error rate (BER) requirement of each type of signal. The modulator 212 includes several mechanisms (not shown) that perform the transformation from a sequence of bits to a sequence of modulated symbols $\{a_0, a_1, a_2, \ldots\}$ according to the selected modulation type, modulation level, and average power per packet. The spreader 216, as will be described in more detail below, generates the digital signal to be transmitted by segmenting the sequence of modulated symbols into fixed-length blocks, and then multiplying each segment or block by assigned codes from the spreading matrix 214.

The spreader 216 transfers the spread signal to the channel filter 218. The transmitter 210 may include a conventional up-converter (not shown) that transforms the baseband-inodulated signal into a carrier-modulated signal at frequency F1 in a well-known manner. The transmitter 210 also includes conventional power amplifiers and antenna components (not shown) capable of transmitting signals.

The transmitter 230 generates its carrier-modulated signal in a similar manner using a different set of codes from the spreading matrix 234.

The receiver 250 receives the signals superimposed from transmitters 210 and 230 after being subjected to different propagation delays. The exemplary receiver 250 includes a conventional antenna and frequency down-converter (not shown), an A/D converter 252, a despreading matrix 254, a correlator 256, a signal demultiplexer 258, signal interpolators 260 and 266, down-samplers 262 and 268, and demodulators 264 and 270. It will be appreciated that the receiver 250 may perform the above operations in hardware or in software and may include additional devices that aid in the reception or processing of information.

The receiver 250 receives a composite signal from transmitters 210 and 230. The down-converter (not shown) generates a baseband version of the received signal. The signal is then sampled (e.g., at 2× the Nyquist rate) at the A/D converter 252 and transferred to the correlator 256.

Correlator 256 selects the codes to be used in conjunction with transmitters 210 and 230 from the despreading matrix 254 and uses them to despread the received composite signal. As will be described in more detail below, the despreading codes are provided in the form of a select-and-add matrix that is different from and cyclically orthogonal to the codes used to spread the signals at transmitters 210 and 230. In this way, interference caused by, for example, the near-far effect can be eliminated. Moreover, since the correlator 256 uses a select-and-add matrix to despread the received signal, the need for the correlator 256 to perform complex multiplication operations is eliminated, thereby allowing a less complex correlator to be implemented. Once the signal is despread, the correlator 256 transfers the despread signal for further processing by the interpolators 260 and 266, down-samplers 262 and 268, and demodulators 264 and 270 in a well-known manner.

Exemplary Processing

Figure 3A:
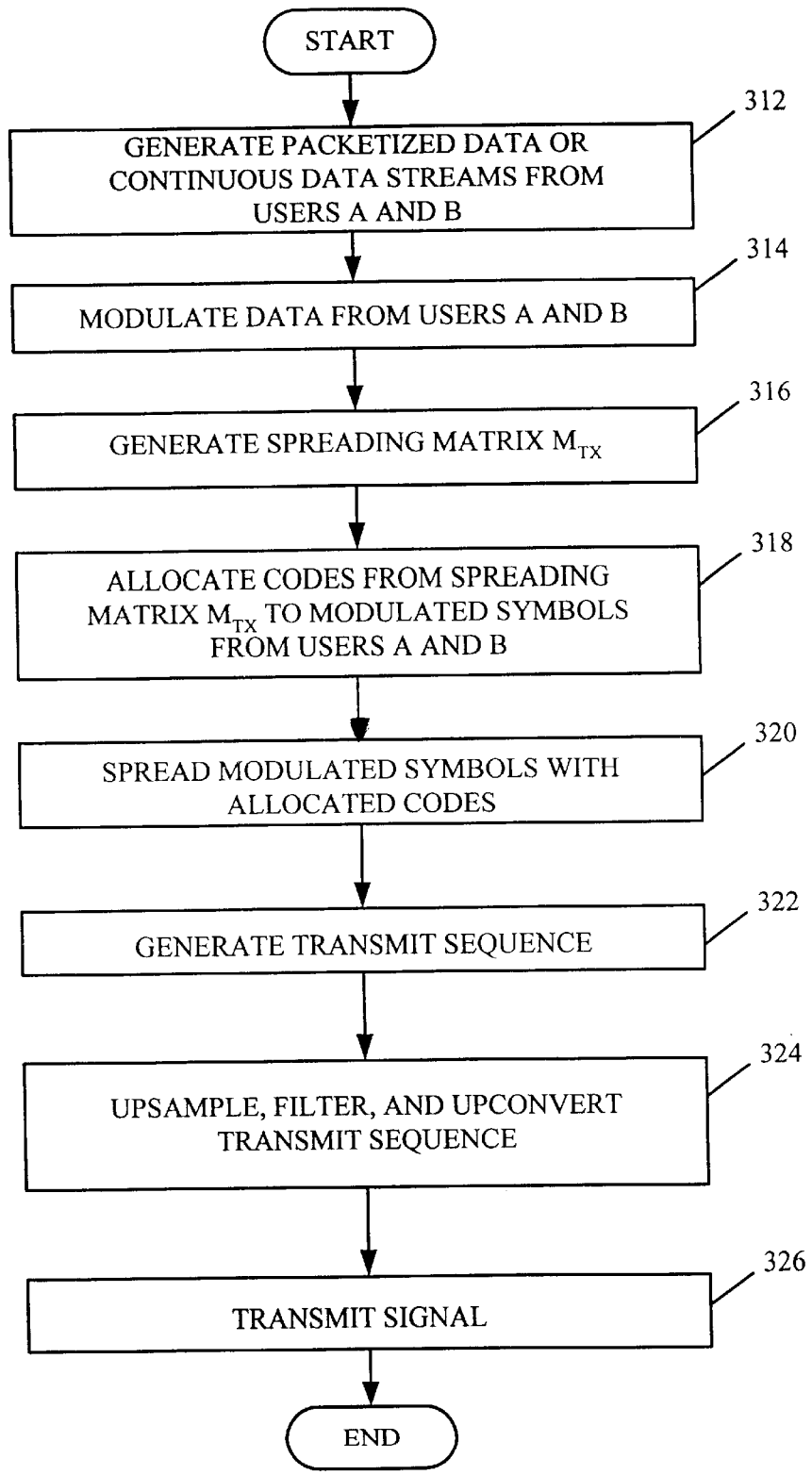
FIG. 3A illustrates an exemplary process for transmitting signals consistent with the present invention.

FIG. 3A illustrates an exemplary process for transmitting signals consistent with the present invention. Assume for simplicity that a communication network (e.g., network 100) includes two transmitters 210 and 230 located in, for example, wireless devices 111 and 112, respectively, that communicate with a common receiver 250 located in, for example, base station 120. Assume further that a user, e.g., user A, is associated with wireless device 111 and a different user, e.g., user B, is associated with wireless device 112.

Each wireless device 111 and 112 generates data (e.g., packetized data or a continuous data stream) for transmission by the wireless device's respective transmitter [step 312]. The modulator 212 and 232 of each wireless device modulates the data in a well-known manner [step 314]. The process defines, for example, the modulated symbols transmitted by users A and B, from wireless devices 111 and 112, respectively, that are located at arbitrary distances from the common receiver 250, as:

$\{a_0, a_1\}$
$\{b_0, b_1, b_2, b_3\}$.

Assuming that $\{c_0, c_1, c_3, c_4, c_5, c_6, c_7, c_8, c_9, c_{10}, c_{11}, c_{12}, c_{13}, c_{14}\}$ represents the base pseudo noise (PN) sequence. "C", the transmitters (e.g., transmitter 210) generate a spreading matrix $M_{TX}$ using circular shifts [step 316] as illustrated below:

$$M_{TX} = \begin{pmatrix} c_0 & c_1 & c_2 & c_3 & c_4 & c_5 & c_6 & c_7 & c_8 & c_9 & c_{10} & c_{11} & c_{12} & c_{13} & c_{14} \\ c_{14} & c_0 & c_1 & c_2 & c_3 & c_4 & c_5 & c_6 & c_7 & c_8 & c_9 & c_{10} & c_{11} & c_{12} & c_{13} \\ c_{13} & c_{14} & c_0 & c_1 & c_2 & c_3 & c_4 & c_5 & c_6 & c_7 & c_8 & c_9 & c_{10} & c_{11} & c_{12} \\ c_{12} & c_{13} & c_{14} & c_0 & c_1 & c_2 & c_3 & c_4 & c_5 & c_6 & c_7 & c_8 & c_9 & c_{10} & c_{11} \\ c_{11} & c_{12} & c_{13} & c_{14} & c_0 & c_1 & c_2 & c_3 & c_4 & c_5 & c_6 & c_7 & c_8 & c_9 & c_{10} \\ c_{10} & c_{11} & c_{12} & c_{13} & c_{14} & c_0 & c_1 & c_2 & c_3 & c_4 & c_5 & c_6 & c_7 & c_8 & c_9 \\ c_9 & c_{10} & c_{11} & c_{12} & c_{13} & c_{14} & c_0 & c_1 & c_2 & c_3 & c_4 & c_5 & c_6 & c_7 & c_8 \\ c_8 & c_9 & c_{10} & c_{11} & c_{12} & c_{13} & c_{14} & c_0 & c_1 & c_2 & c_3 & c_4 & c_5 & c_6 & c_7 \\ c_7 & c_8 & c_9 & c_{10} & c_{11} & c_{12} & c_{13} & c_{14} & c_0 & c_1 & c_2 & c_3 & c_4 & c_5 & c_6 \\ c_6 & c_7 & c_8 & c_9 & c_{10} & c_{11} & c_{12} & c_{13} & c_{14} & c_0 & c_1 & c_2 & c_3 & c_4 & c_5 \\ c_5 & c_6 & c_7 & c_8 & c_9 & c_{10} & c_{11} & c_{12} & c_{13} & c_{14} & c_0 & c_1 & c_2 & c_3 & c_4 \\ c_4 & c_5 & c_6 & c_7 & c_8 & c_9 & c_{10} & c_{11} & c_{12} & c_{13} & c_{14} & c_0 & c_1 & c_2 & c_3 \\ c_3 & c_4 & c_5 & c_6 & c_7 & c_8 & c_9 & c_{10} & c_{11} & c_{12} & c_{13} & c_{14} & c_0 & c_1 & c_2 \\ c_2 & c_3 & c_4 & c_5 & c_6 & c_7 & c_8 & c_9 & c_{10} & c_{11} & c_{12} & c_{13} & c_{14} & c_0 & c_1 \\ c_1 & c_2 & c_3 & c_4 & c_5 & c_6 & c_7 & c_8 & c_9 & c_{10} & c_{11} & c_{12} & c_{13} & c_{14} & c_0 \end{pmatrix}$$

It will be appreciated that the spreading matrix $M_{TX}$ may be of a square or rectangular form. In the case of a rectangular spreading matrix $M_{TX}$, it will be further appreciated that the rectangular (M×N, M<N) spreading matrix $M_{TX}$ may be broken down into K (M×M) square sub-matrices and one ((N−KM)×M) rectangular sub-matrix. In an implementation consistent with the present invention, each square sub-matrix includes rows of codes that are circular shifts of one another. The use of cyclic codes within each square sub-matrix leads to perfect orthogonality within the codes of each square sub-matrix and cyclic cross-correlations between codes of different square sub-matrices.

The transmitters 210 and 230 assign, via a spreader 216 and 236, a number of codes from the spreading matrix $M_{TX}$ to users A and B, respectively, based on the number of modulated symbols to be transmitted from users A and B at a particular time [step 318]. For example, assuming user A transmits two symbols $\{a_0, a_1\}$, the spreader 216 associated with wireless device 111 assigns two codes (or rows) from matrix $M_{TX}$ to those symbols. Similarly, since user B transmits four symbols $\{b_0, b_1, b_2, b_3\}$, the spreader 236 associated with wireless device 112 assigns four codes from the matrix $M_{TX}$ to user B.

Figure 4:
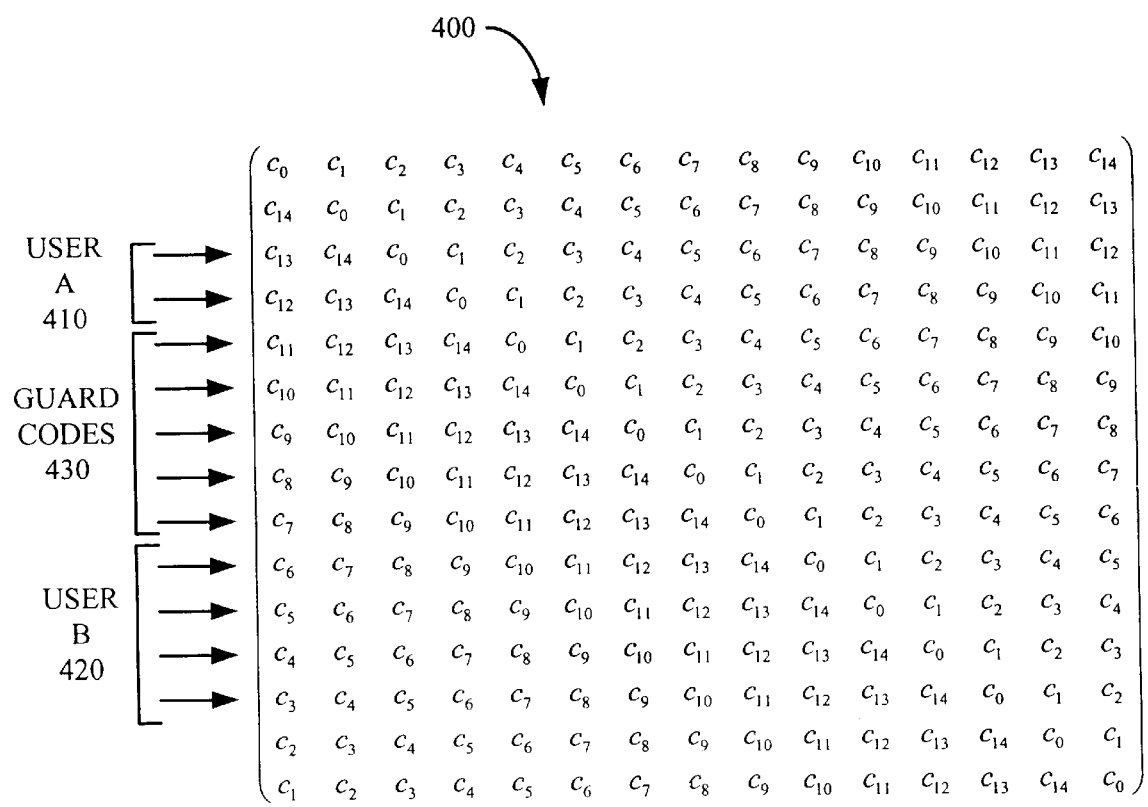
FIG. 4 illustrates an exemplary method for allocating codes of a spreading matrix.

FIG. 4 illustrates an exemplary allocation of codes from the spreading matrix $M_{TX}$ 400 to users A and B. As illustrated, the spreader 216 of wireless device 111 allocates codes $\{3, 4\}$ (or rows 3 and 4), denoted 410 in FIG. 4, of the spreading matrix $M_{TX}$ 400 to user A. Codes $\{3, 4\}$ correspond to the rows beginning with $c_{13}$ and $c_{12}$, respectively, in the matrix $M_{TX}$ 400. Similarly, the spreader 236 of wireless device 112 allocates the codes $\{10, 11, 12, 13\}$, denoted 420 in FIG. 4, of the matrix $M_{TX}$ 400 to user B. Codes $\{10, 11, 12, 13\}$ correspond to the rows beginning with $c_6$–$c_3$, respectively.

In order to guarantee that the signals from user A and user B will not interfere with one another, a number of codes located between those codes allocated to user A 410 and user B 420 in matrix $M_{TX}$ 400, referred to as "guard codes" 430, are left unassigned. The guard codes 430, illustrated in matrix $M_{TX}$ 400 as rows 5–9, aid in reducing the effects of a lack of synchronization between the individual transmitters 210 and 230, and receiver 250. Assuming a maximum time synchronization uncertainty, $N_{uncertainty}$, between users A and B to be 2 symbol times, the number of guard codes should be chosen so as to exceed $2*N_{uncertainty}$.

To further reduce the effects of a lack of synchronization between the transmitters 210 and 230, and receiver 250, the transmitters 210 and 230 circularly extend the spreading matrix $M_{TX}$ to the left and right. For example, the extensions to the left and to the right may be represented respectively as:

$$\begin{pmatrix} c_{12} & c_{13} & c_{14} \\ c_{11} & c_{12} & c_{13} \\ c_{10} & c_{11} & c_{12} \\ c_9 & c_{10} & c_{11} \\ c_8 & c_9 & c_{10} \\ c_7 & c_8 & c_9 \\ c_6 & c_7 & c_8 \\ c_5 & c_6 & c_7 \\ c_4 & c_5 & c_6 \\ c_3 & c_4 & c_5 \\ c_2 & c_3 & c_4 \\ c_1 & c_2 & c_3 \\ c_0 & c_1 & c_2 \\ c_{14} & c_0 & c_1 \\ c_{13} & c_{14} & c_0 \end{pmatrix} \text{ and } \begin{pmatrix} c_0 & c_1 & c_2 \\ c_{14} & c_0 & c_1 \\ c_{13} & c_{14} & c_0 \\ c_{12} & c_{13} & c_{14} \\ c_{11} & c_{12} & c_{13} \\ c_{10} & c_{11} & c_{12} \\ c_9 & c_{10} & c_{11} \\ c_8 & c_9 & c_{10} \\ c_7 & c_8 & c_9 \\ c_6 & c_7 & c_8 \\ c_5 & c_6 & c_7 \\ c_4 & c_5 & c_6 \\ c_3 & c_4 & c_5 \\ c_2 & c_3 & c_4 \\ c_1 & c_2 & c_3 \end{pmatrix}.$$

The circularly extended spreading matrix $M_{TX}$ can then be written as:

$$\begin{pmatrix} c_{12} & c_{13} & c_{14} & c_0 & c_1 & c_2 & c_3 & c_4 & c_5 & c_6 & c_7 & c_8 & c_9 & c_{10} & c_{11} & c_{12} & c_{13} & c_{14} & c_0 & c_1 & c_2 \\ c_{11} & c_{12} & c_{13} & c_{14} & c_0 & c_1 & c_2 & c_3 & c_4 & c_5 & c_6 & c_7 & c_8 & c_9 & c_{10} & c_{11} & c_{12} & c_{13} & c_{14} & c_0 & c_1 \\ c_{10} & c_{11} & c_{12} & c_{13} & c_{14} & c_0 & c_1 & c_2 & c_3 & c_4 & c_5 & c_6 & c_7 & c_8 & c_9 & c_{10} & c_{11} & c_{12} & c_{13} & c_{14} & c_0 \\ c_9 & c_{10} & c_{11} & c_{12} & c_{13} & c_{14} & c_0 & c_1 & c_2 & c_3 & c_4 & c_5 & c_6 & c_7 & c_8 & c_9 & c_{10} & c_{11} & c_{12} & c_{13} & c_{14} \\ c_8 & c_9 & c_{10} & c_{11} & c_{12} & c_{13} & c_{14} & c_0 & c_1 & c_2 & c_3 & c_4 & c_5 & c_6 & c_7 & c_8 & c_9 & c_{10} & c_{11} & c_{12} & c_{13} \\ c_7 & c_8 & c_9 & c_{10} & c_{11} & c_{12} & c_{13} & c_{14} & c_0 & c_1 & c_2 & c_3 & c_4 & c_5 & c_6 & c_7 & c_8 & c_9 & c_{10} & c_{11} & c_{12} \\ c_6 & c_7 & c_8 & c_9 & c_{10} & c_{11} & c_{12} & c_{13} & c_{14} & c_0 & c_1 & c_2 & c_3 & c_4 & c_5 & c_6 & c_7 & c_8 & c_9 & c_{10} & c_{11} \\ c_5 & c_6 & c_7 & c_8 & c_9 & c_{10} & c_{11} & c_{12} & c_{13} & c_{14} & c_0 & c_1 & c_2 & c_3 & c_4 & c_5 & c_6 & c_7 & c_8 & c_9 & c_{10} \\ c_4 & c_5 & c_6 & c_7 & c_8 & c_9 & c_{10} & c_{11} & c_{12} & c_{13} & c_{14} & c_0 & c_1 & c_2 & c_3 & c_4 & c_5 & c_6 & c_7 & c_8 & c_9 \\ c_3 & c_4 & c_5 & c_6 & c_7 & c_8 & c_9 & c_{10} & c_{11} & c_{12} & c_{13} & c_{14} & c_0 & c_1 & c_2 & c_3 & c_4 & c_5 & c_6 & c_7 & c_8 \\ c_2 & c_3 & c_4 & c_5 & c_6 & c_7 & c_8 & c_9 & c_{10} & c_{11} & c_{12} & c_{13} & c_{14} & c_0 & c_1 & c_2 & c_3 & c_4 & c_5 & c_6 & c_7 \\ c_1 & c_2 & c_3 & c_4 & c_5 & c_6 & c_7 & c_8 & c_9 & c_{10} & c_{11} & c_{12} & c_{13} & c_{14} & c_0 & c_1 & c_2 & c_3 & c_4 & c_5 & c_6 \\ c_0 & c_1 & c_2 & c_3 & c_4 & c_5 & c_6 & c_7 & c_8 & c_9 & c_{10} & c_{11} & c_{12} & c_{13} & c_{14} & c_0 & c_1 & c_2 & c_3 & c_4 & c_5 \\ c_{14} & c_0 & c_1 & c_2 & c_3 & c_4 & c_5 & c_6 & c_7 & c_8 & c_9 & c_{10} & c_{11} & c_{12} & c_{13} & c_{14} & c_0 & c_1 & c_2 & c_3 & c_4 \\ c_{13} & c_{14} & c_0 & c_1 & c_2 & c_3 & c_4 & c_5 & c_6 & c_7 & c_8 & c_9 & c_{10} & c_{11} & c_{12} & c_{13} & c_{14} & c_0 & c_1 & c_2 & c_3 \end{pmatrix}$$

The spreader 216 and 236 of each wireless device spreads the data symbols of the respective user A or B with the allocated codes, 410 and 420, from spreading matrix $M_{TX}$ 400 [step 320]. To accomplish this, each transmitter 210 and 230 multiplies the individual modulated symbols of users A or B by the respective codes 410 and 420 allocated to users A and B. For example, the spreader 216 of the wireless device 111 multiplies user A's symbols $\{a_0, a_1,\}$ by the third and fourth rows of the circularly-extended spreading matrix $M_{TX}$ 400, respectively. Similarly, spreader 236 of wireless device 112 multiplies user B's symbols $\{b_0, b_1, b_2, b_3\}$ by the tenth through thirteenth rows, respectively, of the spreading matrix $M_{TX}$ 400. Such multiplication operations act to spread the data symbols [step 320]. The result of the multiplication operations can be illustrated as follows:

$\{\{a_0 c_{10}, a_0 c_{11}, a_0 c_{12}, a_0 c_{13}, a_0 c_{14}, a_0 c_0, a_0 c_1, a_0 c_2, a_0 c_3, a_0 c_4, a_0 c_5, a_0 c_6, a_0 c_7, a_0 c_8, a_0 c_9, a_0 c_{10}, a_0 c_{11}, a_0 c_{12}, a_0 c_{13}, a_0 c_{14}, a_0 c_0\},$
$\{a_1 c_9, a_1 c_{10}, a_1 c_{11}, a_1 c_{12}, a_1 c_{13}, a_1 c_{14}, a_1 c_0, a_1 c_1, a_1 c_2, a_1 c_3, a_1 c_4, a_1 c_5, a_1 c_6, a_1 c_7, a_1 c_8, a_1 c_9, a_1 c_{10}, a_1 c_{11}, a_1 c_{12}, a_1 c_{13}, a_1 c_{14}\}\}$, and $\{\{b_0 c_3, b_0 c_4, b_0 c_5, b_0 c_6, b_0 c_7, b_0 c_8, b_0 c_9, b_0 c_{10}, b_0 c_{11}, b_0 c_{12}, b_0 c_{13}, b_0 c_{14}, b_0 c_0, b_0 c_1, b_0 c_2, b_0 c_3, b_0 c_4, b_0 c_5, b_0 c_6, b_0 c_7, b_0 c_8\}, \{b_1 c_2, b_1 c_3, b_1 c_4, b_1 c_5, b_1 c_7, b_1 c_8, b_1 c_9, b_1 c_{10}, b_1 c_{11}, b_1 c_{12}, b_1 c_{13}, b_1 c_{14}, b_1 c_0, b_1 c_1, b_1 c_2, b_1 c_3, b_1 c_4, b_1 c_5, b_1 c_6, b_1 c_7\}, \{b_2 c_1, b_2 c_2, b_2 c_3, b_2 c_4, b_2 c_5, b_2 c_6, b_2 c_7, b_2 c_8, b_2 c_9, b_2 c_{10}, b_2 c_{11}, b_2 c_{12}, b_2 c_{13}, b_2 c_{14}, b_2 c_0, b_2 c_1, b_2 c_2, b_2 c_3, b_2 c_4, b_2 c_5, b_2 c_6\}, \{b_3 c_0, b_3 c_1, b_3 c_2, b_3 c_3, b_3 c_4, b_3 c_5, b_3 c_6, b_3 c_7, b_3 c_8, b_3 c_9, b_3 c_{10}, b_3 c_{11}, b_3 c_{12}, b_3 c_{13}, b_3 c_{14}, b_3 c_0, b_3 c_1, b_3 c_2, b_3 c_3, b_3 c_4, b_3 c_5\}\}$.

The spreader 216 and 236 of each wireless device then adds the spread information column by column to group the modulated symbols to be transmitted together at a particular time [step 322]. The addition operation results in the following groups of signals for users A and B, respectively:

$\{a_1 c_9 + a_0 c_{10}, a_1 c_{10} + a_0 c_{11}, a_1 c_{11} + a_0 c_{12}, a_1 c_{12} + a_0 c_{13}, a_1 c_{13} + a_0 c_{14}, a_1 c_{14} + a_0 c_0, a_1 c_0 + a_0 c_1, a_1 c_1 + a_0 c_2, a_1 c_2 + a_0 c_3, a_1 c_3 + a_0 c_4, a_1 c_4 + a_0 c_5, a_1 c_5 + a_0 c_6, a_1 c_6 + a_0 c_7, a_1 c_7 + a_0 c_8, a_1 c_8 + a_0 c_9, a_1 c_9 + a_0 c_{10}, a_1 c_{10} + a_0 c_{11}, a_1 c_{11} + a_0 c_{12}, a_1 c_{12} + a_0 c_{13}, a_1 c_{13} + a_0 c_{14}, a_1 c_{14} + a_0 c_0\}$, and $\{b_3 c_0 + b_2 c_1 + b_1 c_2 + b_0 c_3, b_3 c_1 + b_2 c_2 + b_1 c_3 + b_0 c_4, b_3 c_2 + b_2 c_3 + b_1 c_4 + b_0 c_5, b_3 c_3 + b_2 c_4 + b_1 c_5 + b_0 c_6, b_3 c_4 + b_2 c_5 + b_1 c_6 + b_0 c_7, b_3 c_5 + b_2 c_6 + b_1 c_7 + b_0 c_8, b_3 c_6 + b_2 c_7 + b_1 c_8 + b_0 c_9, b_3 c_7 + b_2 c_8 + b_1 c_9 + b_0 c_{10}, b_3 c_8 + b_2 c_9 + b_1 c_{10} + b_0 c_{11}, b_3 c_9 + b_2 c_{10} + b_1 c_{11} + b_0 c_{12}, b_3 c_{10} + b_2 c_{11} + b_1 c_{12} + b_0 c_{13}, b_3 c_{11} + b_2 c_{12} + b_1 c_{13} + b_0 c_{14}, b_3 c_{12} + b_2 c_{13} + b_1 c_{14} + b_0 c_0, b_3 c_{13} + b_2 c_{14} + b_1 c_0 + b_0 c_1, b_3 c_{14} + b_2 c_0 + b_1 c_1 + b_0 c_2, b_3 c_0 + b_2 c_1 + b_1 c_2 + b_0 c_3, b_3 c_1 + b_2 c_2 + b_1 c_3 + b_0 c_4, b_3 c_2 + b_2 c_3 + b_1 c_4 + b_0 c_5, b_3 c_3 + b_2 c_4 + b_1 c_5 + b_0 c_6, b_3 c_4 + b_2 c_5 + b_1 c_6 + b_0 c_7, b_3 c_5 + b_2 c_6 + b_1 c_7 + b_0 c_8\}$.

During time period one, for example, the transmitter 210 and 230 transmits signal $\{a_1, c_9 + a_0 c_{10}\}$ for user A and transmits signal $\{b_3 c_0 + b_2 c_1 + b_1 c_2 + b_0 c_3\}$ for user B. For simplification, the above-described group of signals for users A and B can be rewritten, respectively, as:

$\{X_{A_0}, X_{A_1}, X_{A_2}, X_{A_3}, X_{A_4}, X_{A_5}, X_{A_6}, X_{A_7}, X_{A_8}, X_{A_9}, X_{A_{10}}, X_{A_{11}}, X_{A_{12}}, X_{A_{13}}, X_{A_{14}}, X_{A_{15}}, X_{A_{16}}, X_{A_{17}}, X_{A_{18}}, X_{A_{19}}, X_{A_{20}}\}$, and $\{X_{B_0}, X_{B_1}, X_{B_2}, X_{B_3}, X_{B_4}, X_{B_5}, X_{B_6}, X_{B_7}, X_{B_8}, X_{B_9}, X_{B_{10}}, X_{B_{11}}, X_{B_{12}}, X_{B_{13}}, X_{B_{14}}, X_{B_{15}}, X_{B_{16}}, X_{B_{17}}, X_{B_{18}}, X_{B_{19}}, X_{B_{20}}\}$, where the values of $X_A$ and $X_B$ are given, respectively, by:

$X_{A_0} = a_1 c_9 + a_0 c_{10}$
$X_{A_1} = a_1 c_{10} + a_0 c_{11}$
$X_{A_2} = a_1 c_{11} + a_0 c_{12}$
$X_{A_3} = a_1 c_{12} + a_0 c_{13}$
$X_{A_4} = a_1 c_{13} + a_0 c_{14}$
$X_{A_5} = a_1 c_{14} + a_0 c_0$
$X_{A_6} = a_1 c_0 + a_0 c_1$
$X_{A_7} = a_1 c_1 + a_0 c_2$
$X_{A_8} = a_1 c_2 + a_0 c_3$
$X_{A_9} = a_1 c_3 + a_0 c_4$
$X_{A_{10}} = a_1 c_4 + a_0 c_5$
$X_{A_{11}} = a_1 c_5 + a_0 c_6$
$X_{A_{12}} = a_1 c_6 + a_0 c_7$
$X_{A_{13}} = a_1 c_7 + a_0 c_8$
$X_{A_{14}} = a_1 c_8 + a_0 c_9$
$X_{A_{15}} = a_1 c_9 + a_0 c_{10}$
$X_{A_{16}} = a_1 c_{10} + a_0 c_{11}$
$X_{A_{17}} = a_1 c_{11} + a_0 c_{12}$
$X_{A_{18}} = a_1 c_{12} + a_0 c_{13}$
$X_{A_{19}} = a_1 c_{13} + a_0 c_{14}$
$X_{A_{20}} = a_1 c_{14} + a_0 c_0$
and
$X_{B_0} = b_3 c_0 + b_2 c_1 + b_1 c_2 + b_0 c_3$
$X_{B_1} = b_3 c_1 + b_2 c_2 + b_1 c_3 + b_0 c_4$
$X_{B_2} = b_3 c_2 + b_2 c_3 + b_1 c_4 + b_0 c_5$
$X_{B_3} = b_3 c_3 + b_2 c_4 + b_1 c_5 + b_0 c_6$
$X_{B_4} = b_3 c_4 + b_2 c_5 + b_1 c_6 + b_0 c_7$
$X_{B_5} = b_3 c_5 + b_2 c_6 + b_1 c_7 + b_0 c_8$
$X_{B_6} = b_3 c_6 + b_2 c_7 + b_1 c_8 + b_0 c_9$
$X_{B_7} = b_3 c_7 + b_2 c_8 + b_1 c_9 + b_0 c_{10}$
$X_{B_8} = b_3 c_8 + b_2 c_9 + b_1 c_{10} + b_0 c_{11}$
$X_{B_9} = b_3 c_9 + b_2 c_{10} + b_1 c_{11} + b_0 c_{12}$
$X_{B_{10}} = b_3 c_{10} + b_2 c_{11} + b_1 c_{12} + b_0 c_{13}$
$X_{B_{11}} = b_3 c_{11} + b_2 c_{12} + b_1 c_{13} + b_0 c_{14}$
$X_{B_{12}} = b_3 c_{12} + b_2 c_{13} + b_1 c_{14} + b_0 c_0$
$X_{B_{13}} = b_3 c_{13} + b_2 c_{14} + b_1 c_0 + b_0 c_1$
$X_{B_{14}} = b_3 c_{14} + b_2 c_0 + b_1 c_1 + b_0 c_2$
$X_{B_{15}} = b_3 c_0 + b_2 c_1 + b_1 c_2 + b_0 c_3$
$X_{B_{16}} = b_3 c_1 + b_2 c_2 + b_1 c_3 + b_0 c_4$
$X_{B_{17}} = b_3 c_2 + b_2 c_3 + b_1 c_4 + b_0 c_5$ -continued $X_{B_{18}} — b_3 c_3 + b_2 c_4 + b_1 c_5 + b_0 c_6$
$X_{B_{19}} — b_3 c_4 + b_2 c_5 + b_1 c_6 + b_0 c_7$
$X_{B_{20}} — b_3 c_5 + b_2 c_6 + b_1 c_7 + b_0 c_8.$ The transmitters 210 and 230 then filter and up-convert the spread signals [step 324] and transmit the spread up-converted signals via the antenna [step 326].

Figure 3B:
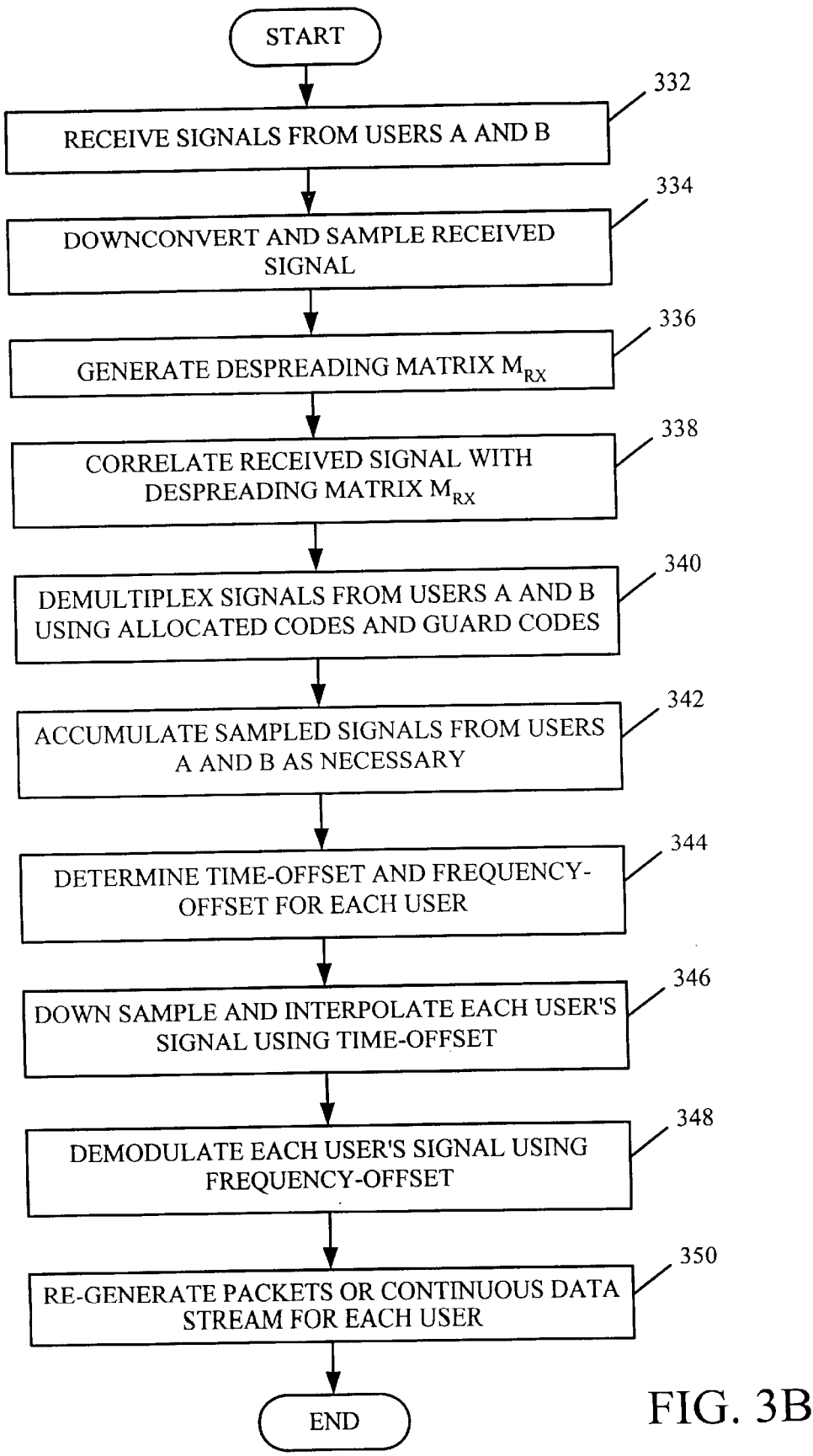
FIG. 3B illustrates an exemplary process, consistent with the present invention, for processing signals received at a receiver.

FIG. 3B illustrates an exemplary process, consistent with the present invention, for processing signals received at a receiver. The common receiver (e.g., receiver 250) receives the signal transmitted by the wireless devices 111 and 112 containing spread data symbols for user A and user B [step 332]. A down-converter generates a baseband version of the received signal in a well-known manner (e.g., by down-converting and sampling the signal) [step 334]. The baseband signal at the common receiver 250 can be expressed as $$z(t) = \sum_k X_{A_k} h_A(t - kt - \epsilon_A T) + X_{B_k} h_B(t - kt - \epsilon_B T) + w(t)$$

where h(t) is the channel impulse response that can be different from user to user, w(t) is the added channel noise (e.g., Gaussian noise), and $\epsilon_A$ and $\epsilon_B$ are the fraction delay offsets for the transmission for user A and user B, respectively.

The receiver 250 samples the signal z(t) at a rate of $1/T_s$, where $T/T_s$ is the over-sample factor. The samples of the discrete time signal available at the receiver 250 at time $$t = n\frac{T}{T_s}$$

can be represented as:

$$z(n) = z\left(t = n\frac{T}{T_s}\right) = \sum_k X_{A_k} h_A\left((n-k)\frac{T}{T_s} - \epsilon_A T\right) +$$
$$X_{B_k} h_B\left((-k)\frac{T}{T_s} - \epsilon_B T\right) + w(n)$$
$$= \sum_k X_{A_k} H_{A_{n+k}} + X_{B_k} H_{B_{n-k}} + w(n)$$

where
$H_A = \{h_{A_0}, h_{A_1}, h_{A_2}, h_{A_3}, h_{A_4}, h_{A_5}, h_{A_6}, h_{A_7}, h_{A_8}, h_{A_9}, h_{A_{10}}, h_{A_{11}}, h_{A_{12}}, h_{A_{13}}, h_{A_{14}}\}$,
$H_B = \{h_{B_0}, h_{B_1}, h_{B_2}, h_{B_3}, h_{B_4}, h_{B_5}, h_{B_6}, h_{B_7}, h_{B_8}, h_{B_9}, h_{B_{10}}, h_{B_{11}}, h_{B_{12}}, h_{B_{13}}, h_{B_{14}}\}$, and
where
$h_{A_j} = h_A((n-j)T/T_s - \epsilon_A T), j=0, 1, 2, \ldots$
$h_{B_j} = h_A((n-j)T/T_s - \epsilon_B T), j=0, 1, 2, \ldots$
represent the finite-length sampled versions of the channel impulse responses for users A and B, respectively. The noise free signals received from user A and user B, given by
$Y_A = \Sigma_k X_{A_k} H_{A_{n-k}}$
$Y_B = \Sigma_k X_{B_k} H_{B_{n-k}}$
can be calculated by convolving the above pulses with the sampled version of the channel impulse responses $H_A$ and $H_B$ to form the signals $Y_A$ and $Y_B$, respectively.

The signals from user A and user B are combined at the common receiver 250 to form the signal $Z = Y_A + Y_B$.

The following illustrates the beginning and ending portions of the discrete time signal received from user A:

$h_{A_0} x_{A_0}$
$h_{A_0} x_{A_0} + h_{A_1} x_{A_0}$
$h_{A_0} x_{A_0} + h_{A_1} x_{A_0} + h_{A_2} x_{A_0}$
$h_{A_0} x_{A_0} + h_{A_1} x_{A_0} + h_{A_2} x_{A_0} + h_{A_3} x_{A_0}$
$h_{A_1} x_{A_0} + h_{A_2} x_{A_0} + h_{A_3} x_{A_0} + h_{A_4} x_{A_0} + h_{A_0} x_{A_1}$
$h_{A_2} x_{A_0} + h_{A_3} x_{A_0} + h_{A_4} x_{A_0} + h_{A_5} x_{A_0} + h_{A_0} x_{A_1} + h_{A_1} x_{A_1}$
$h_{A_3} x_{A_0} + h_{A_4} x_{A_0} + h_{A_5} x_{A_0} + h_{A_6} x_{A_0} + h_{A_0} x_{A_{1+A_1}} x_{A_1} + h_{A_2} x_{A_1}$
. . .
$h_{A_{12}} x_{A_{19}} + h_{A_{13}} x_{A_{19}} + h_{A_{14}} x_{a_{19}} + x_{A_8} x_{A_{20}} + h_{A_9} x_{A_{20}} + h_{A_{10}} x_{A_{20}} + h_{A_{11}} x_{A_{20}}$
$h_{A_{13}} x_{A_{19}} + h_{A_{14}} x_{A_{19}} + h_{A_9} x_{A_{20}} + h_{A_{10}} x_{A_{20}} + h_{A_{11}} x_{A_{20}} + h_{A_{12}} x_{A_{20}}$
$h_{A_{14}} x_{A_{19}} + h_{A_{10}} x_{A_{20}} + h_{A_{11}} x_{A_{20}} + h_{A_{12}} x_{A_{20}} + h_{A_{13}} x_{A_{20}}$
$h_{A_{11}} x_{A_{20}} + h_{A_{12}} x_{A_{20}} + h_{A_{13}} x_{A_{20}} + h_{A_{14}} x_{A_{20}}$
$h_{A_{12}} x_{A_{20}} + h_{A_{13}} x_{A_{20}} + h_{A_{14}} x_{A_{20}}$
$h_{A_{13}} x_{A_{20}} + h_{A_{14}} x_{A_{20}}$
$h_{A_{14}} x_{A_{20}}$

Similarly, the following illustrates the beginning and ending portions of the discrete time signal received from user B:

$h_{B_0} x_{B_0}$
$h_{B_0} x_{B_0} + h_{B_1} x_{B_0}$
$h_{B_0} x_{B_0} + h_{B_1} x_{B_0} + h_{B_2} x_{B_0}$
$h_{B_0} x_{B_0} + h_{B_1} x_{B_0} + h_{B_2} x_{B_0} + h_{B_3} x_{B_0}$
$h_{B_1} x_{B_0} + h_{B_2} x_{B_0} + h_{B_3} x_{B_0} + h_{B_4} x_{B_0} + h_{B_0} x_{B_1}$
$h_{B_2} x_{B_0} + h_{B_3} x_{B_0} + h_{B_4} x_{B_0} + h_{B_5} x_{B_0} + h_{B_0} x_{B_1} + h_{B_1} x_{B_1}$
$h_{B_3} x_{B_0} + h_{B_4} x_{B_0} + h_{B_5} x_{B_0} + h_{B_6} x_{B_0} + h_{B_0} x_{B_1} + h_{B_1} x_{B_1} + h_{B_2} x_{B_1}$
. . .
$h_{B_{12}} x_{B_{19}} + h_{B_{19}} x_{B_{19}} + h_{B_{14}} x_{B_{19}} + h_{B_8} x_{B_{20}} + h_{B_9} x_{B_{20}} + h_{B_{10}} x_{B_{20}} + h_{B_{11}} x_{B_{20}}$
$h_{B_{13}} x_{B_{19}} + h_{B_4} x_{B_{19}} + h_{B_9} x_{B_{20}} + h_{B_{10}} x_{B_{20}} + h_{B_{11}} x_{B_{20}} + h_{B_{12}} x_{B_{20}}$
$h_{B_{14}} x_{B_{19}} + h_{B_{10}} x_{B_{20}} + h_{B_{11}} x_{B_{20}} + h_{B_{12}} x_{B_{20}} + h_{B_{13}} x_{B_{20}}$
$h_{B_{11}} x_{B_{20}} + h_{B_{12}} x_{B_{20}} + h_{B_{13}} x_{B_{20}} + h_{B_{14}} x_{B_{20}}$
$h_{B_{12}} x_{B_{20}} + h_{B_{13}} x_{B_{20}} + h_{B_{14}} x_{B_{20}}$
$h_{B_{13}} x_{B_{20}} + h_{B_{14}} x_{B_{20}}$
$h_{B_{14}} x_{B_{20}}$

The following illustrates the beginning and ending portions of the "aggregate" discrete time signal received from users A and B:

$h_{A_0} x_{A_0} + h_{B_0} x_{B_0}$
$h_{A_0} x_{A_0} + h_{A_1} x_{A_0} + h_{B_0} x_{B_0} + h_{B_1} x_{B_0}$
$h_{A_0} x_{A_0} + h_{A_1} x_{A_0} + h_{A_2} x_{A_0} + h_{B_0} x_{B_0} + h_{B_1} x_{B_0} + h_{B_2} x_{B_0}$
. . .
$h_{A_{12}} x_{A_{20}} + h_{A_{13}} x_{A_{20}} + h_{A_{14}} x_{A_{20}} + h_{B_{12}} x_{B_{20}} + h_{B_{13}} x_{B_{20}} + h_{B_{14}} x_{B_{20}}$
$h_{A_{13}} x_{A_{20}} + h_{A_{14}} x_{A_{20}} + h_{B_{13}} x_{B_{20}} + h_{B_{14}} x_{B_{20}}$
$h_{A_{14}} x_{A_{20}} + h_{B_{14}} x_{B_{20}}$

An expanded form of the above signals can be obtained by re-inserting the values for $X_A$ and $X_B$. The initial samples of the signal received from user A can therefore be represented as:

$(a_1 c_9 + a_0 c_{10}) h_{A_0}$
$(a_1 c_9 + a_0 c_{10}) h_{A_0} + (a_1 c_9 + a_0 c_{10}) h_{A_1}$
$(a_1 c_9 + a_0 c_{10}) h_{A_0} + (a_1 c_9 + a_0 c_{10}) h_{A_1}$

Similarly, the initial samples of the signal received from user B can be represented in expanded form as:

$(b_3 c_0 + b_2 c_1 + b_1 c_2 + b_0 c_3) h_{B_0}$
$(b_3 c_0 + b_2 c_1 + b_1 c_2 + b_0 c_3) h_{B_0} + (b_3 c_0 + b_2 c_1 + b_1 c_2 + b_0 c_3) h_{B_1}$
$(b_3 c_0 + b_2 c_1 + b_1 c_2 + b_0 c_3) h_{B_0} + (b_3 c_0 + b_2 c_1 + b_1 c_2 + b_0 c_3) h_{B_1} + (b_3 c_0 + b_2 c_1 + b_1 c_2 + b_0 c_3) h_{B_2}$.

An expanded form of the initial samples of the "aggregate" discrete time signal received from users A and B can be represented as:

$(a_1 \ c_9 + a_0 \ c_{10}) \ h_{A_0} + (b_3 \ c_0 + b_2 \ c_1 + b_1 \ c_2 + b_0 \ c_3) \ h_{B_0}$ $(a_1 \ c_9 + a_0 \ c_{10}) \ h_{A_0} + (a_1 \ c_9 + a_0 \ c_{10}) \ h_{A_1} + (b_3 \ c_0 + b_2 \ c_1 + b_1 \ c_2 + b_0 \ c_3) \ h_{B_0} + (b_3 \ c_0 + b_2 \ c_1 + b_1 \ c_2 + b_0 \ c_3) \ h_{B_1}$

A receiver 250, consistent with the present invention, generates a select-and-add, despreading matrix $M_{RX}$ to despread signals available to the correlator 256 [step 336]. To illustrate how a select-and-add matrix is generated, assume that the base PN sequence C is represented as:

$\{1, 1, 1, 1, -1, 1, -1, 1, 1, -1, -1, 1, -1, -1, -1\}$ and that the corresponding spreading matrix $M_{TX}$ used by the transmitters 210 and 230 is represented by:

$$M_{TX} = \begin{pmatrix} 1 & 1 & 1 & 1 & -1 & 1 & -1 & 1 & 1 & -1 & -1 & 1 & -1 & -1 & -1 \\ -1 & 1 & 1 & 1 & 1 & -1 & 1 & -1 & 1 & 1 & -1 & -1 & 1 & -1 & -1 \\ -1 & -1 & 1 & 1 & 1 & 1 & -1 & 1 & -1 & 1 & 1 & -1 & -1 & 1 & -1 \\ -1 & -1 & -1 & 1 & 1 & 1 & 1 & -1 & 1 & -1 & 1 & 1 & -1 & -1 & 1 \\ 1 & -1 & -1 & -1 & 1 & 1 & 1 & 1 & -1 & 1 & -1 & 1 & 1 & -1 & -1 \\ -1 & 1 & -1 & -1 & -1 & 1 & 1 & 1 & 1 & -1 & 1 & -1 & 1 & 1 & -1 \\ -1 & -1 & 1 & -1 & -1 & -1 & 1 & 1 & 1 & 1 & -1 & 1 & -1 & 1 & 1 \\ 1 & -1 & -1 & 1 & -1 & -1 & -1 & 1 & 1 & 1 & 1 & -1 & 1 & -1 & 1 \\ 1 & 1 & -1 & -1 & 1 & -1 & -1 & -1 & 1 & 1 & 1 & 1 & -1 & 1 & -1 \\ -1 & 1 & 1 & -1 & -1 & 1 & -1 & -1 & -1 & 1 & 1 & 1 & 1 & -1 & 1 \\ 1 & -1 & 1 & 1 & -1 & -1 & 1 & -1 & -1 & -1 & 1 & 1 & 1 & 1 & -1 \\ -1 & 1 & -1 & 1 & 1 & -1 & -1 & 1 & -1 & -1 & -1 & 1 & 1 & 1 & 1 \\ 1 & -1 & 1 & -1 & 1 & 1 & -1 & -1 & 1 & -1 & -1 & -1 & 1 & 1 & 1 \\ 1 & 1 & -1 & 1 & -1 & 1 & 1 & -1 & -1 & 1 & -1 & -1 & -1 & 1 & 1 \\ 1 & 1 & 1 & -1 & 1 & -1 & 1 & 1 & -1 & -1 & 1 & -1 & -1 & -1 & 1 \end{pmatrix}$$

The despreading matrix $M_{RX}$ may be obtained by inverting the spreading matrix $M_{TX}$ and performing normalization. It will be appreciated that, in the case where the spreading matrix $M_{TX}$ is of a rectangular (e.g., when the number of codes used is greater than the number of dimensions available) or square, but not invertible, form, the despreading matrix $M_{RX}$ may be obtained by pseudo-inverting the spreading matrix $M_{TX}$.

An exemplary despreading matrix $M_{RX}$ can be represented as:

$$M_{RX} = \begin{pmatrix} 1 & 0 & 0 & 0 & 1 & 0 & 0 & 1 & 1 & 0 & 1 & 0 & 1 & 1 & 1 \\ 1 & 1 & 0 & 0 & 0 & 1 & 0 & 0 & 1 & 1 & 0 & 1 & 0 & 1 & 1 \\ 1 & 1 & 1 & 0 & 0 & 0 & 1 & 0 & 0 & 1 & 1 & 0 & 1 & 0 & 1 \\ 1 & 1 & 1 & 1 & 0 & 0 & 0 & 1 & 0 & 0 & 1 & 1 & 0 & 1 & 0 \\ 0 & 1 & 1 & 1 & 1 & 0 & 0 & 0 & 1 & 0 & 0 & 1 & 1 & 0 & 1 \\ 1 & 0 & 1 & 1 & 1 & 1 & 0 & 0 & 0 & 1 & 0 & 0 & 1 & 1 & 0 \\ 0 & 1 & 0 & 1 & 1 & 1 & 1 & 0 & 0 & 0 & 1 & 0 & 0 & 1 & 1 \\ 1 & 0 & 1 & 0 & 1 & 1 & 1 & 1 & 0 & 0 & 0 & 1 & 0 & 0 & 1 \\ 1 & 1 & 0 & 1 & 0 & 1 & 1 & 1 & 1 & 0 & 0 & 0 & 1 & 0 & 0 \\ 0 & 1 & 1 & 0 & 1 & 0 & 1 & 1 & 1 & 1 & 0 & 0 & 0 & 1 & 0 \\ 0 & 0 & 1 & 1 & 0 & 1 & 0 & 1 & 1 & 1 & 1 & 0 & 0 & 0 & 1 \\ 1 & 0 & 0 & 1 & 1 & 0 & 1 & 0 & 1 & 1 & 1 & 1 & 0 & 0 & 0 \\ 0 & 1 & 0 & 0 & 1 & 1 & 0 & 1 & 0 & 1 & 1 & 1 & 1 & 0 & 0 \\ 0 & 0 & 1 & 0 & 0 & 1 & 1 & 0 & 1 & 0 & 1 & 1 & 1 & 1 & 0 \\ 0 & 0 & 0 & 1 & 0 & 0 & 1 & 1 & 0 & 1 & 0 & 1 & 1 & 1 & 1 \end{pmatrix}$$

It will be above despreading matrix $M_{RX}$ is merely an example. It is apparent from the above spreading and despreading matrices that the despreading matrix $M_{RX}$ and the spreading matrix $M_{TX}$ are different and that the despreading matrix $M_{RX}$ contains only 1's and 0's. By allowing transmitters 210 and 230 and receiver 250 to use different spreading and orthogonal despreading codes, respectively, the interference caused by each other's transmissions (e.g., due to the near-far effect) can be eliminated. Moreover, as will be described in more detail below, the use of only 1's and 0's in the despreading matrix $M_{RX}$ eliminates the multiplication operations generally performed by the correlator (or matched filters in the correlator) in the despreading process. This allows for the implementation of a less complex correlator in the receiver.

Once the despreading matrix $M_{RX}$ is generated, the correlator 256 despreads the received signal Z using the despreading matrix $M_{RX}$ [step 338]. According to conventional techniques, the despreading process involves multiplying the signal by the first column of the matrix, then by the second column of the matrix, etc. However, since the despreading matrix $M_{RX}$ contains only 1's and 0's, the multiplication operations inherent in conventional techniques can be replaced with a simple select-and-add operation. As such, the correlator 256 performs a select operation in those positions in the despreading matrix $M_{RX}$ where a "1" exists. The correlator 256 ignores those positions where a zero exists. The correlator 256 then adds the selected signals.

The correlator 256 may remove the cyclic padding in the received signal that was added at the transmitter side to enable correct signal reception in the presence of time uncertainties. As assumed above, the values of the base PN sequence C at the transmitter side correspond as follows:

$\{c_0 \rightarrow 1, \ c_1 \rightarrow 1, \ c_2 \rightarrow 1, \ c_3 \rightarrow 1, \ c_4 \rightarrow -1, \ c_5 \rightarrow 1, \ c_6 \rightarrow -1,$
$c_7 \rightarrow 1, \ c_8 \rightarrow 1, \ c_9 \rightarrow -1, \ c_{10} \rightarrow -1, \ c_{11} \rightarrow -1, \ c_{12} \rightarrow -1,$
$c_{13} \rightarrow 1, \ c_{14} \rightarrow -1\}.$ Substituting these values of the PN sequence C into the received signal Z, the components of the first signal can be rewritten, for example, as:

$(-a_0 - a_1) \ h_{A_0} + (-a_0 - a_1) \ h_{A_1} + (-a_0 - a_1) \ h_{A_2} + (-a_0 - a_1) \ h_{A_3} + (-a_0 - a_1) \ h_{A_4} + (-a_0 - a_1) \ h_{A_5} + (-a_0 - a_1) \ h_{A_6} + (-a_0 - a_1) \ h_{A_7} + (-a_0 + a_1) \ h_{A_8} + (-a_0 + a_1) \ h_{A_9} + (-a_0 + a_1) \ h_{A_{10}} + (-a_0 + a_1) \ h_{A_{11}} + (-a_0 - a_1) \ h_{A_{12}} + (-a_0 - a_1) \ h_{A_{13}} + (-a_0 - a_1) \ h_{A_{14}} + (b_0 - b_1 + b_2 - b_3) \ h_{B_0} + (b_0 - b_1 + b_2 - b_3) \ h_{B_1} + (b_0 - b_1 + b_2 - b_3) \ h_{B_2} + (b_0 - b_1 + b_2 - b_3) \ h_{B_3} + (b_0 - b_1 + b_2 - b_3) \ h_{B_4} + (b_0 - b_1 + b_2 - b_3) \ h_{B_5} + (b_0 - b_1 + b_2 - b_3) \ h_{B_6} + (b_0 - b_1 + b_2 - b_3) \ h_{B_7} + (b_0 - b_1 + b_2 - b_3) \ h_{B_8} + (b_0 - b_1 + b_2 - b_3) \ h_{B_9} + (b_0 - b_1 + b_2 - b_3) \ h_{B_{10}} + (b_0 - b_1 + b_2 - b_3) \ h_{B_{11}} + (b_0 - b_1 + b_2 - b_3) \ h_{B_{12}} + (b_0 - b_1 + b_2 - b_3) \ h_{B_{13}} + (b_0 - b_1 + b_2 - b_3) \ h_{B_{14}}.$

As expected, this sample includes components of the data sequence transmitted by transmitter 210 of user A filtered by (i.e., convolved with) the impulse response $h_A$ of the channel between transmitter 210 and the receiver 250 and components of the data sequence transmitted by transmitter 230 of user B filtered by the impulse response $h_B$ of the channel between transmitter 230 and the receiver 250.

When the received signal Z is despread using the despreading matrix $M_{RX}$, the following result is obtained for time instances $T_0$–$T_{59}$, respectively:

0

$a_0\ h_{A_0}$ $a_0\ (h_{A_0}+h_{A_1})$ $a_0\ (h_{A_0}+h_{A_1}+h_{A_2})$ $a_0\ (h_{A_0}+h_{A_1}+h_{A_2}+h_{A_3})$ $a_1\ (h_{A_0}+a_0\ (h_{A_1}+h_{A_2}+h_{A_3}+h_{A_4})$ $a_1\ (h_{A_0}+h_{A_1})+h_2\ (h_{A_2}+h_{A_3}+h_{A_4}+h_{A_5})$ $a_1\ (h_{A_0}+h_{A_1}+h_{A_2})+a_0\ (h_{A_3}+h_{A_4}+h_{A_5}+h_{A_6})$ $a_1\ (h_{A_0}+h_{A_1}+h_{A_2}+h_{A_3})+a_0\ (h_{A_4}+h_{A_5}+h_{A_6}+h_{A_7})$ $a_1\ (h_{A_1}+h_{A_2}+h_{A_3}+h_{A_4})+a_0\ (h_{A_5}+h_{A_6}+h_{A_7}+h_{A_8})$ $a_1\ (h_{A_2}+h_{A_3}+h_{A_4}+h_{A_5})+a_0\ (h_{A_6}+h_{A_7}+h_{A_8}+h_{A_9})$ $a_1\ (h_{A_3}+h_{A_4}+h_{A_5}+h_{A_6})+a_0\ (h_{A_7}+h_{A_8}+h_{A_9}+h_{A_{10}})$ $a_1\ (h_{A_4}+h_{A_5}+h_{A_6}+h_{A_7})+a_0\ (h_{A_8}+h_{A_9}+h_{A_7}+h_{A_{10}}+h_{A_{11}})$ $a_1\ (h_{A_5}+h_{A_6}+h_{A_7}+h_{A_8})+a_0\ (h_{A_9}+h_{A_{10}}+h_{A_{11}}+h_{A_{12}})$ $a_1\ (h_{A_6}+h_{A_7}+h_{A_8}+h_{A_9})+a_0\ (h_{A_{10}}+h_{A_6}+h_{A_{11}}+h_{A_{12}}+h_{A_{13}})$ $a_1\ (h_{A_7}+h_{A_8}+h_{A_9}+h_{A_{10}})+a_0\ (h_{A_{11}}+h_{A_6}+h_{A_{12}}+h_{A_{13}}+h_{A_{14}})$ $a_1\ (h_{A_8}+h_{A_9}+h_{A_{10}}+h_{A_{11}})+a_0\ (h_{A_{12}}+h_{A_6}+h_{A_{13}}+h_{A_{14}})$ $a_1\ (h_{A_9}+h_{A_{10}}+h_{A_8}+h_{A_{11}})+a_0\ (h_{A_{12}}+h_{A_6}+h_{A_{13}}+h_{A_{14}})$ $a_1\ (h_{A_{10}}+h_{A_{11}}+h_{A_{12}}+h_{A_{13}})+a_0\ (h_{A_{14}}$ $a_1\ (h_{A_{11}}+h_{A_{12}}+h_{A_{13}}+h_{A_{14}})$ $a_1\ (h_{A_{12}}+h_{A_{13}}+h_{A_{14}})$ $a_1\ (h_{A_{13}}+h_{A_{14}})$ $a_1\ h_{A_{14}}$

0

0

0

0

0

0

$b_0\ h_{B_0}$ $b_0\ (h_{B_0}+h_{B_1})$ $b_0\ (h_{B_0}+h_{B_1}+h_{B_2})$ $b_0\ (h_{B_0}+h_{B_1}+h_{B_2}+h_{B_3})$ $b_1\ h_{B_0}\ (h_{B_1}+h_{B_2}+h_{B_3}+h_{B_4})$ $b_1\ (h_{B_0}+h_{B_1})+b_0\ (h_{B_2}+h_{B_3}+h_{B_4}+h_{B_5})$ $b_1\ (h_{B_0}+h_{B_1}+h_{B_2})+b_0\ (h_{B_3}+h_{B_4}+h_{B_5}+h_{B_6})$ $b_1\ (h_{B_0}+h_{B_1}+h_{B_2}+h_{B_3})+b_0\ (h_{B_4}+h_{B_5}+h_{B_6}+h_{B_7})$ $b_2\ h_{B_0}+b_1\ (h_{B_1})+h_{B_2}+h_{B_3}+h_{B_4})+b_0\ (h_{B_5}+h_{B_6}+h_{B_7}+h_{B_8})$ $b_2\ (h_{B_0}+h_{B_1})+b_1\ (h_{B_2}+h_{B_3}+h_{B_4}+h_{B_5})+b_0\ (h_{B_6}+h_{B_7}+h_{B_8}+h_{B_9})$ $b_2\ (h_{B_0}+h_{B_1}+h_{B_2})+b_1\ (h_{B_3}+h_{B_4}+h_{B_5}+h_{B_6})+b_0\ (h_{B_7}+h_{B_8}+h_{B_9}+h_{B_{10}})$ $b_2\ (h_{B_0}+h_{B_1}+h_{B_2}+h_{B_3})+b_1\ (h_{B_4}+h_{B_5}+h_{B_6}+h_{B_7})+b_0\ (h_{B_8}+h_{B_9}+h_{B_{10}}+h_{B_{11}})$ $b_3\ (h_{B_0}+b_2\ (h_{B_1}+b_2+b_3+b_4)+b_1\ (h_{B_5}+b_6+h_{B_7}+h_{B_8})+b_0\ (h_{B_9}+h_{B_{10}}+h_{B_{11}}+h_{B_{12}})$ $b_3\ (h_{B_0}+h_{B_1})+b_2\ (h_{B_2}+h_{B_3}+h_{B_4}+h_{B_5})+b_1\ (h_{B_6}+h_{B_7}+h_{B_8}+h_{B_9})+b_0\ (h_{B_{10}}+h_{B_{11}}+h_{B_{12}}+h_{B_{13}})$ $b_3\ (h_{B_0}+h_{B_1}+h_{B_2})+b_2\ (h_{B_3}+h_{B_4}+h_{B_5}+h_{B_6})+b_1\ (h_{B_7}+h_{B_8}+h_{B_9}+h_{B_{10}})+h_0\ (h_{B_{11}}+h_{B_{12}}+h_{B_{13}}+h_{B_{14}})$ $b_3\ (h_{B_0}+h_{B_1}+h_{B_2}+h_{B_3})+b_2\ (h_{B_4}+h_{B_5}+h_{B_6}+h_{B_7})+b_1\ (h_{B_8}+h_{B_9}+h_{B_{10}}+h_{B_{11}})+h_0\ (h_{B_{12}}+h_{B_{13}}+h_{B_{14}})$ $b_3\ (h_{B_1}+h_{B_2}+h_{B_3}+h_{B_4})+b_2\ (h_{B_5}+h_{B_6}+h_{B_7}+h_{B_8})+b_1\ (h_{B_9}+h_{B_{10}}+h_{B_{11}}+h_{B_{12}})+h_0\ (h_{B_{13}}+h_{B_{14}})$ $b_3\ (h_{B_2}+h_{B_3}+h_{B_4}+h_{B_5})+b_2\ (h_{B_6}+h_{B_7}+h_{B_8}+h_{B_9})+b_1\ (h_{B_{10}}+h_{B_{11}}+h_{B_{12}}+h_{B_{13}})+b_0\ h_{B_{14}}$ $b_3\ (h_{B_3}+h_{B_4}+h_{B_5}+h_{B_6})+b_2\ (h_{B_7}+h_{B_8}+h_{B_9}+h_{B_{10}})+b_1\ (h_{B_{11}}+h_{B_{12}}+h_{B_{13}}+h_{B_{14}})$ $b_3\ (h_{B_4}+h_{B_5}+h_{B_6}+h_{B_7})+b_2\ (h_{B_8}+h_{B_9}+h_{B_{10}}+h_{B_{11}})+b_1\ (h_{B_{12}}+h_{B_{13}}+h_{B_{14}})$ $b_3\ (h_{B_5}+h_{B_6}+h_{B_7}+h_{B_8})+b_2\ (h_{B_9}+h_{B_{10}}+h_{B_{11}}+h_{B_{12}})+b_1\ (h_{B_{13}}+h_{B_{14}})$ $b_3\ (h_{B_6}+h_{B_7}+h_{B_8}+h_{B_9})+b_2\ (h_{B_{10}}+h_{B_{11}}+h_{B_{12}}+h_{B_{13}})+b_1\ h_{B_{14}}$ $b_3\ (h_{B_7}+h_{B_8}+h_{B_9}+h_{B_{10}})+b_2\ (h_{B_{11}}+h_{B_{12}}+h_{B_{13}}+h_{B_{14}})$ $b_3\ (h_{B_8}+h_{B_9}+h_{B_{10}}+h_{B_{11}})+b_2\ (h_{B_{12}}+h_{B_{13}}+h_{B_{14}})$ $b_3\ (h_{B_9}+h_{B_{10}}+h_{B_{11}}+h_{B_{12}})+b_2\ (h_{B_{13}}+h_{B_{14}})$ $b_3\ (h_{B_{10}}+h_{B_{11}}+h_{B_{12}}+h_{B_{13}})+b_2\ h_{B_{14}}$ $b_3\ (h_{B_{11}}+h_{B_{12}}+h_{B_{13}}+h_{B_{14}})$ $b_3\ (h_{B_{12}}+h_{B_{13}}+h_{B_{14}})$ $b_3\ (h_{B_{13}}+h_{B_{14}})$ $b_3\ h_{B_{14}}$

0.

As expected, the despread signal reproduces exactly the waveform of a signal as it would be obtained by transmitting sequences $\{a_0, a_1\}$ and $\{b_0, b_1, b_2, b_3\}$ using TDMA in time slots [3, 4] and [10, 11, 12, 13], respectively, corresponding to the codes allocated to transmitters 210, {3, 4}, and 230, {10, 11, 12, 13}. As such, it is possible to isolate the signal from user A and the signal from user B via demultiplexer 258 [step 340].

Note that the symbol times corresponding to the "code gaps" {[1, 2], [5, 6]} and {[8, 9], [14, 15]} are used by the front and tail ends of the impulse response, while the symbol times corresponding to "code gaps" [6, 7] are "zero." In the case of time uncertainties between transmitters 210 and 230 with respect to the receiver 250, the received signals from user A and from user B "slide" independently in the vertical direction to thereby "occupy" the unused sample slots.

It is evident from the above that intersymbol interference (ISI) between signals received from transmitters 210 and 230 is eliminated. The fact that the output of the correlator 256 "reproduces" the signal as it would be transmitted using TDMA and the fact that there is no (i.e., zero) ISI between A and B demonstrates the orthogonality of the select-and-add operation.

Once the signals have been isolated, via demultiplexer 258, each group of symbols may be processed in a well-known manner. For example, the receiver 250 may accumulate the sampled signals from users A and B [step 342], determine a time-offset and a frequency-offset for each user [step 344], down sample and interpolate each user's signal using the time-offset [step 346], demodulate each user's signal using the frequency-offset [step 348], and re-generate the packets or continuous data stream Systems and methods consistent with the present invention provide a mechanism by which interference in a spread spectrum communication system can be reduced and a less complex receiver implemented. A receiver consistent with the present invention uses a despreading code to despread a signal received in the communication system that is different than the code used to spread the signal prior to transmission. The despreading code is of such a format as to allow the receiver to despread the received signal using a select-and-add operation. As a result, interference between signals from users transmitting at arbitary power levels (a phenomenon usually referred as "near-far-effect") can be eliminated. Moreover, the ability to perform a select-and-add operation instead of the multiplication operations needed in the conventional receiver allows for the use of a less complex receiver.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while systems and methods consistent with the present invention have been described as being used in spread spectrum communication networks, the present invention is not so limited. In fact, the systems and methods described above are equally applicable to any communication environment (e.g., fiber optic communications) that spreads and despreads signals. Moreover, while the above-described processes involved the transmission of signals from two transmitters, the present invention is not so limited. Implementations consistent with the present invention arc equally applicable to the processing of signals from more than two transmitters.

The following claims and their equivalents define the scope of the invention.

What is claimed is:

1. A system for processing a signal in a wireless network, comprising:
   a transmitter configured to select at least one spreading code from a spreading matrix, spread a signal using the at least one spreading code, and transmit the spread signal through the wireless network; and
   a receiver configured to select at least one despreading code from a despreading matrix, the despreading matrix being an inverse of the spreading matrix, despread the transmitted signal using the at least one despreading code, and process the despread signal.

2. The system of claim 1 wherein, when selecting, the transmitter is configured to:
   select the spreading code from a row of the spreading matrix, and
   wherein, when selecting, the receiver is configured to:
      select the despreading code from a column of the despreading matrix.

3. The system of claim 1 wherein the spreading and despreading matrices are of a square form.

4. The system of claim 3 wherein a row of the spreading matrix is a circular cyclic shift of a preceding row.

5. The system of clam 4 wherein a column of the despreading matrix is a circular cyclic shift of a preceding column.

6. The system of claim 1 wherein the spreading and despreading matrices are of a rectangular or square and not invertible form.

7. The system of claim 6 wherein the despreading matrix is a pseudo inverse of the spreading matrix.

8. The system of claim 1 wherein the spreading matrix is an arbitrary matrix of complex numbers.

9. The system of claim 1 wherein the despreading matrix contains only 1's and 0's.

10. The system of claim 9 wherein, when despreading, the receiver is configured to:
    select portions of the spread signal in those positions where the at least one despreading code contains a 1; and
    add the selected portions.

11. The system of claim 1 wherein the spreading matrix is a rectangular matrix having at least one square sub-matrix, the at least one square sub-matrix having rows of codes that are circular cyclic shifts of one another.

12. A system for processing signals in a wireless network, comprising:
    means for selecting a plurality of spreading codes from a spreading matrix;
    means for spreading the signals using the plurality of spreading codes;
    means for transmitting the spread signals through the wireless network;
    means for selecting despreading codes from a despreading matrix, the despreading matrix being an inverse of the spreading matrix;
    means for despreading the transmitted signals using the at least one despreading code; and
    means for processing the despread signals.

13. A method for processing a signal in a wireless network, comprising:
    spreading a signal using one or more spreading codes from a spreading matrix;
    transmitting the spread signal through the wireless network;
    despreading the transmitted signal using one or more despreading codes from a despreading matrix, the despreading matrix being an inverse of the spreading matrix; and
    processing the despread signal.

14. The method of claim 13 further comprising:
    selecting the one or more spreading codes from rows of the spreading matrix; and
    selecting the one or more despreading codes from columns of the despreading matrix.

15. The method of claim 13 wherein the spreading and despreading matrices are square matrices.

16. The method of claim 15 wherein a row of the spreading matrix is a circular cyclic shift of a preceding row of the spreading matrix.

17. The method of claim 13 wherein the spreading matrix is a rectangular or square, but not invertible, matrix.

18. The method of claim 17 wherein the despreading matrix is a pseudo inverse of the spreading matrix.

19. The method of claim 13 wherein the spreading matrix is an arbitrary matrix of complex numbers.

20. The method of claim 13 wherein the despreading matrix contains only 1's and 0's.

21. The method of claim 20 wherein the despreading includes:
    selecting portions of the spread signal in those positions where the one or more despreading codes contain a 1, and
    adding the selected portions.

22. The method of claim 13 wherein the spreading matrix is a rectangular matrix having at least one square sub-matrix, the at least one square sub-matrix having rows of codes that are circular cyclic shifts of one another.

23. A method for processing signals transmitted in a wireless communication system, the method comprising:
    receiving a transmitted signal;
    generating at least one orthogonal despreading code, the at least one orthogonal despreading code being different than a code used to spread the transmitted signal, the spreading code being a row of a spreading matrix of complex numbers;
    despreading the received signal using the at least one orthogonal despreading code; and
    processing the despread signal.

24. The method of claim 23 wherein the spreading matrix is a square matrix and wherein the generating includes:
   inverting the spreading matrix to create a despreading matrix,
   selecting the at least one despreading code from a column of the despreading matrix that corresponds to the row of the spreading matrix, and
   normalizing the selected despreading code.

25. The method of claim 23 wherein the spreading matrix is one of a rectangular and a square, but not invertible, matrix and wherein the generating includes:
   pseudo-inverting the spreading matrix to create a despreading matrix,
   selecting the at least one despreading code from a column of the despreading matrix that corresponds to the row of the spreading matrix, and
   normalizing the selected despreading code.

26. The method of claim 23 wherein the generating at least one orthogonal despreading code generates a despreading code that contains only 1's and 0's.

27. The method of claim 26 wherein the despreading comprises:
   selecting portions of the transmitted signal in those positions where the at least one despreading code contains a 1; and
   adding the selected portions.

28. A receiver having an antenna that receives a signal transmitted in a wireless communication network, the receiver comprising:
   a despreading code generator configured to generate at least one orthogonal despreading code, the at least one orthogonal despreading code being different than a code used to spread the transmitted signal, the spreading code being a row of a spreading matrix; and
   a correlator configured to receive the transmitted signal and the at least one orthogonal despreading code, and despread the received signal using the at least one orthogonal despreading code.

29. The receiver of claim 28 wherein the correlator despreads the received signal by performing a select-and-add operation.

30. The receiver of claim 28 wherein, when generating, the despreading code generator is configured to:
   invert the spreading matrix to form a despreading matrix,
   select the at least one orthogonal despreading code from a column of the despreading matrix, and
   normalize the selected despreading code.

31. The receiver of claim 28 wherein the despreading matrix is a square matrix where each row is a circular cyclic shift of a previous row.

32. The receiver of claim 28 wherein the despreading matrix is a rectangular matrix having at least one square sub-matrix, the at least one square sub-matrix having rows of codes that are circular cyclic shifts of one another.

33. The receiver of claim 28 wherein the spreading matrix is one of a rectangular and square, but not invertible, matrix and wherein, when generating, the despreading code generator is configured to:
   pseudo-invert the spreading matrix to form a despreading matrix,
   select the at least one orthogonal despreading code from a column of the despreading matrix, and
   normalize the selected despreading code.

34. The receiver of claim 28 wherein, when generating, the despreading code generator is configured to:
   generate the at least one orthogonal despreading code such that the despreading code contains only 1's and 0's.

35. The receiver of claim 34 wherein, when despreading, the correlator is configured to:
   select portions of the received signal in those positions where the at least one orthogonal despreading code contains a 1, and
   add the selected portions.

36. A system comprising:
   a first transmitter configured to generate a spreading code matrix, rows of the spreading code matrix corresponding to different spreading codes, allocate a first group of spreading codes in the spreading code matrix to a first signal to be transmitted, spread the first signal using the first group of spreading codes, and transmit the spread first signal; and
   a second transmitter configured to generate the spreading code matrix, allocate a second different group of spreading codes in the spreading code matrix to a second signal to be transmitted, the second different group being allocated such that a third group of unassigned spreading codes is located between the allocated first group and second different group of spreading codes, spread the second signal using the second different group of spreading codes, and transmit the spread second signal.

37. The system of claim 36 wherein the second transmitter allocates the second different group of spreading codes such that a number of spreading codes in the third group corresponds to a time synchronization uncertainty factor.

38. The system of claim 36 wherein the first and second transmitters are further configured to circularly extend the spreading code matrix prior to the spreading.

39. The system of claim 36 wherein the spreading code matrix is a rectangular matrix having one or more square sub-matrices, the one or more square sub-matrices having rows of codes that are circular cyclic shifts of one another.

40. The system of claim 36 wherein the spreading code matrix is a square matrix, and wherein each row of the spreading code matrix is a circular cyclic shift of a preceding row.

41. A method for transmitting signals, comprising:
   generating a spreading code matrix, rows of the spreading code matrix corresponding to different spreading codes;
   assigning a first group of spreading codes in the spreading code matrix to a first signal to be transmitted;
   assigning a second different group of spreading codes in the spreading code matrix to a second signal to be transmitted, the second different group being assigned such that a third group of unassigned spreading codes is located between the assigned first group and second different group of spreading codes;
   spreading the first signal using the first group of spreading codes;
   spreading the second signal using the second different group of spreading codes; and
   transmitting the first and second spread signals.

42. The method of claim 41 wherein the assigning the second different group includes:
   assigning the second different group of spreading codes such that a number of spreading codes in the third group corresponds to a time synchronization uncertainty factor.

43. The method of claim 41 further comprising:
circularly extending, prior to assigning, the spreading code matrix.

44. The method of claim 41 wherein the spreading code matrix is a rectangular matrix having one or more square sub-matrices, the one or more square sub-matrices having rows of codes that are circular cyclic shifts of one another.

45. The system of claim 41 wherein the spreading code matrix is a square matrix, and wherein each row of the spreading code matrix is a circular cyclic shift of a preceding row.

46. In a network including at least one transmitter that generates a spreading matrix, the spreading matrix having a plurality of spreading codes, spreads signals using at least one spreading code from the spreading matrix, and transmits the spread signals, and a receiver that the receives the transmitted spread signals, the receiver comprising:

a memory configured to store instructions for generating a despreading matrix, the despreading matrix being an inverse of the spreading matrix and having a plurality of despreading codes, selecting at least one despreading code from the despreading matrix, and despreading the received signals using the at least one despreading code; and a processor configured to execute the instructions in the memory.

47. In a network including a transmitter that transmits signals to one or more receivers, the transmitter comprising:

a memory configured to store instructions for generating a spreading code matrix that contains a plurality of spreading codes, allocating a first group of spreading codes in the spreading code matrix to a first signal to be transmitted, for allocating a second different group to spreading codes in the spreading code matrix to a second signal to be transmitted, the second different group being allocated such that a third group of unassigned spreading codes is located between the allocated first group and second group of spreading codes, for spreading the first signal using the first group of spreading codes, for spreading the second signal using the second different group of spreading codes, and for transmitting the first and second spread signals; and a processor configured to execute the instructions in the memory.

* * * * *